Jan. 31, 1961 — C. C. GEORGIAN — 2,970,101
PREPARATION OF HIGH OCTANE NUMBER MOTOR FUEL BLENDING STOCKS
Filed May 7, 1958 — 6 Sheets-Sheet 1

Fig. 1

INVENTOR.
Carl C. Georgian
BY
ATTORNEY

INVENTOR.
Carl C. Georgian

Fig. 6

United States Patent Office 2,970,101
Patented Jan. 31, 1961

2,970,101

PREPARATION OF HIGH OCTANE NUMBER MOTOR FUEL BLENDING STOCKS

Carl C. Georgian, La Marque, Tex., assignor to The American Oil Company, Texas City, Tex., a corporation of Texas Filed May 7, 1958, Ser. No. 733,695

24 Claims. (Cl. 208—70)

This invention relates to improvements in the production of high octane number motor fuel blending stocks, particularly the production of 97–98 CFR–R clear and higher octane number blending stocks from catalytically cracked gasolines. The invention is also concerned with providing blending stocks which possess desirable characteristics with respect to volatility and, in another aspect, with providing blending stocks having exceptionally high blending octane numbers when blended into a refinery premium gasoline pool. The invention includes the fractionation of catalytic cracked gasoline followed by solvent extraction of the bottoms to segregate low-octane number components, and thus prepare high octane motor fuel blending stocks in an efficient and integrated manner while attaining unprecedented octane levels heretofore unobtainable on a large scale.

Steadily increasing octane levels for both premium and regular motor gasolines have created serious refining problems. The problems are basicly economic in nature because with existing petroleum refining technology it is possible, theoretically at least, to produce gasolines capable of satisfying all octane demands projected for the reasonably distant future. However as the increasing sales volume of premium gasolines, i.e., about 97–98 research octane number and higher, is simultaneously being accompanied by market specifications for premium gasolines having ever increasing octane numbers, the refiner has been hard pressed to meet the extreme demands of both octane and volume. In the early post-war period, refiners had been relying on the existing large capacity of catalytic cracking facilities to produce high octane base or blending stocks for premium gasoline production. At the then-existing octane levels of 90–93 or so for premium grade gasolines, catalytic cracked gasolines of 90–95 research clear were quite satisfactory blend stocks. However, beginning with about 1954, automotive compression ratios of 9:1 and 10:1 and even higher began appearing. These engines demanded gasolines having octane numbers of 98 and above, and as a consequence the petroleum refiner, who had available large volumes of heretofore satisfactory catalytic gasolines, found catalytic gasolines actually establishing a ceiling octane number on his premium pool. At about this time, the appearance and adoption of catalytic hydroforming as a process for upgrading the octane numbers of virgin naphtha provided the necessary octane number appreciation of the total refinery pool. For a while, the combination of catalytic reforming of virgin naphtha and catalytic cracking of heavy gas oils enabled the refiner to meet both his yield and his octane requirements. But now with automotive engines having compression ratios in excess of 10:1, these processes alone have proven insufficient to satisfy the need.

In addition to octane number requirements, the refiner must meet other quality specifications in finished gasoline. One of the most important of these is volatility, which is a measure of the ease at which automotive engines start and carburet in cold weather. The volatility problem has been intensified by the advent of catalytic reforming on a large scale, due to the so-called "aromatics shift," or increase in boiling point of a naphthene or paraffin upon aromatization to the corresponding aromatic compound. Thus a catalytic hydroformate inevitably is less volatile than the corresponding virgin feedstock, and consequently the entire refinery pool is faced with poor volatility characteristics.

It is therefore a primary object of the instant invention to provide an economically attractive process for increasing the refinery pool and premium grade octane numbers while at the same time improving the volatility characteristics of premium gasolines. An additional object is to produce motor fuel blending stocks which have exceptionally high octane numbers when blended with base stocks such as catalytic reformate, motor fuel alkylate, and polymer gasoline. Yet another object is to provide a process for producing high octane blending stocks from catalytic cracked gasoline of 87–95 octane number, the final blending stocks having 97–98 and higher research clear octane numbers and being obtainable in yields in excess of 90 volume percent on feed. Other and more particular objects will become apparent as the description of the invention proceeds.

In accordance with the objects above it has now been discovered that exceptionally high octane blending stocks may be prepared from catalytic cracked gasolines by fractionally distilling the gasoline to obtain a relatively low boiling, high-octane component and a higher boiling but low octane heavy component, and subjecting the heavy component to selective extraction to separate an aromatics rich extract from a low octane predominantly aliphatic raffinate. The aliphatic raffinate contains low octane number aliphatic compounds, and may be blended into quality jet fuels or subjected to catalytic hydroforming for octane appreciation in the presence of hydrogen gas and a catalyst effective to dehydrocyclize paraffins. By control over the initial fractionation step and of the selective extraction step, the light gasoline and extract yields are correlated to provide motor fuel blending components having exceptionally high blending octane numbers, while virtually all of the low octane number paraffins are simultaneously rejected to the raffinate where they are excluded from premium blends. By appropriate correlation of fractionation with extraction, as herein described, high octane number components of the catalytic cracked gasoline are retained in the blend stock, and the relatively expensive processing operations of catalytic hydroforming and selective solvent extraction are applied only to that portion of the catalytic gasoline which will realize a substantial benefit in octane numbers. Hence processing facilities may be constructed and maintained at a cost well below that of equivalent facilities necessary for prior art octane upgrading systems.

The invention will be more clearly understood by reference to the attached drawings in which—

Figure 1:
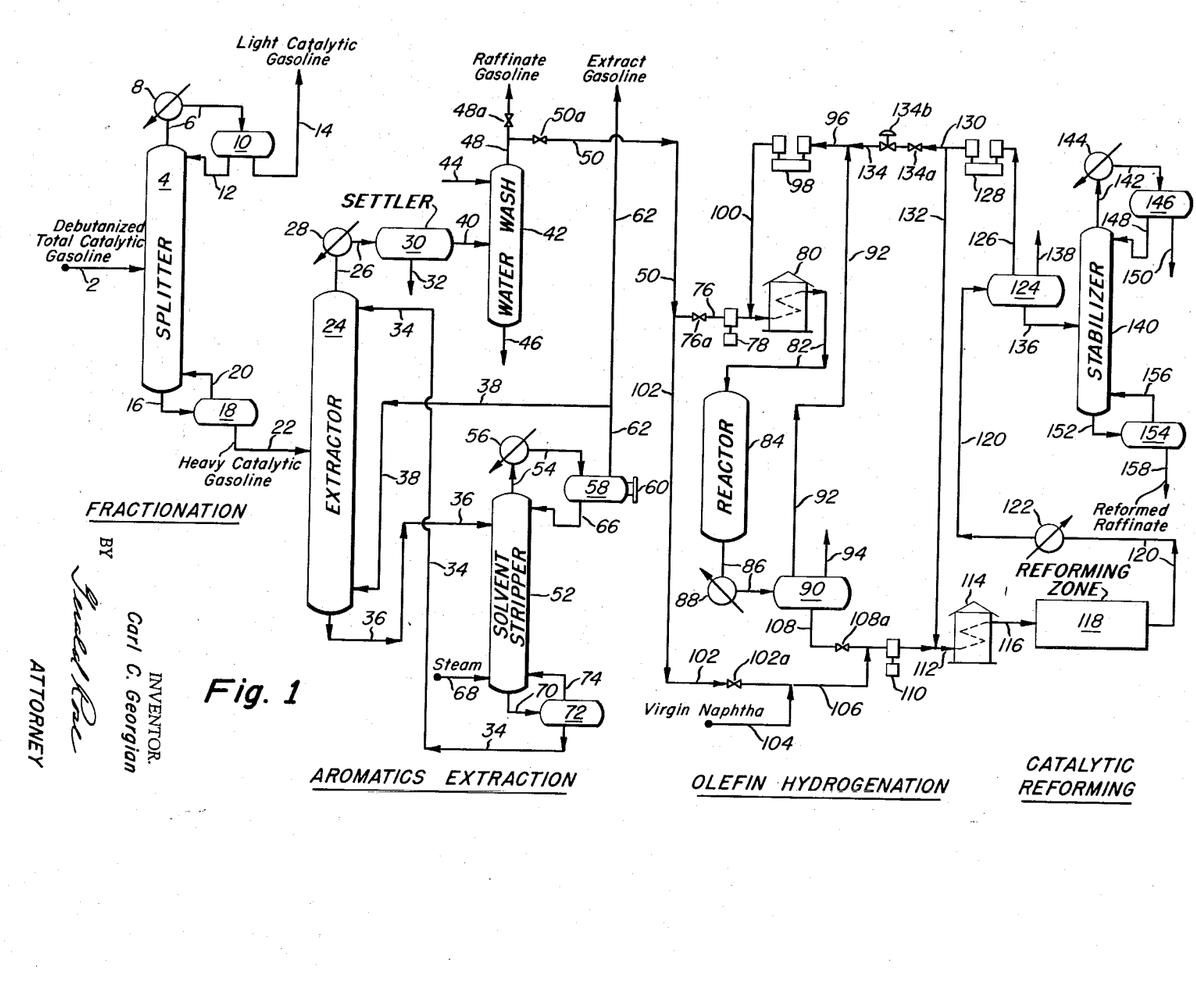
Figure 1 is a schematic flowsheet of the plant, showing alternate provisions for processing the low octane raffinate gasoline.

Referring to Figure 1 showing a plant for the processing of catalytic gasoline according to the instant invention, operations commence with the introduction of 20,000 barrels per day of debutanized catalytic gasoline having a research octane number clear of 94.0, through line 2 into splitter fractionator 4. The catalytic gasoline is essentially debutanized, that is it is distilled in external facilities to separate the propane-propylene and butane-butylene fractions, the former for catalytic polymerization and the latter to be conducted to catalytic alkylation facilities external to the process. This particular gasoline has an ASTM distillation range of 106 to 406° F., and has a component analysis (by fluorescent indicator adsorption) of 25.6 volume percent aromatics, 38.7 percent olefins, and 35.7 percent saturates. It will be understood that the composition of the catalytic gasoline charge stock depends to no inconsiderable extent on the crude oil source, on the processing conditions in the catalytic cracking unit, and especially on the fractionation conditions in the catalytic gasoline debutanizing facilities. It may contain up to several volume percent butanes, and may have an end point in the range of about 350 to 450° F. Its octane number generally ranges from about 87 where the cracking catalyst is silica magnesia, to about a limit of 95 where a silica alumina catalyst is employed at a cracking temperture on the order of 950° F. Only under exceptionally unusual cracking conditions does the feedstock octane number exceed 95 research clear.

In splitter fractionator 4—a tower operating at atmospheric or slight superatmospheric pressure with a reboiler temperature of 245° F. and an overhead temperature of 137° F.—the gasoline is carefully fractionated into a light catalytic gasoline component having an octane number higher than the debutanized gasoline and a heavy catalytic gasoline component with a lower octane number. The efficiency and economy of the overall process depends to a large extent on the efficiency of fractionation in splitter fractionator 4, and for this reason fractionator 4 is provided with 35 actual trays and a comparatively high reflux ratio of 2:1. The debutanized catalytic gasoline charge is split as closely and accurately as possible at about 200° F. so that aliphatics, paraffins, olefins, and naphthenes in the light catalytic gasoline overhead boil below about the boiling point of n-heptane, while the bottoms contain aliphatics including n-heptane and higher boiling aliphatics. In general, the fractionation is conducted so that the light gasoline contains less than about 10, and preferably less than about 2% of material boiling above 200° F. by true boiling point (TBP) distillation, and the heavy catalytic gasoline bottoms contains less than 15 and preferably less than about 5 volume percent of hydrocarbons boiling below 200° F. (by TBP distillation).

The importance of careful fractionation in splitter fractionator 4 cannot be over emphasized. While virtually all aromatic compounds within the gasoline boiling range have high octane numbers, irrespective of their identity, the octane numbers of aliphatics boiling below 200° F. are considerably higher than those boiling above this temperature. This may be shown with reference to Table I below, reporting computed octane numbers of three fractions distilled from a catalytic gasoline and their analysis reported in the literature (Melpolder et al., Ind. Eng. Chem., vol. 44, 1142–46, 1952).

TABLE I

WEIGHTED AVERAGE RESEARCH OCTANE NUMBERS

|  | IBP-200° F. Fraction | 200-300° F. Fraction | 300-400° F. Fraction |
|---|---|---|---|
| Paraffins | 80.2 | 32.4 | 33 |
| Cycloparaffins | 86.3 | 63.3 | 44 |
| Olefins | 96.2 | 55.1 | 75 |
| Cycloolefins | 97.5 | 98.0 | 89 |
| Aromatics | 100.0 | 118.0 | 113.7 |
|  | 90.4 | 82.1 | 81.2 |

VOLUME PERCENT IN FRACTION

|  | | | |
|---|---|---|---|
| Paraffins | 14.95 | 3.27 | 6.36 |
| Cycloparaffins | 2.04 | 2.71 | 5.47 |
| Olefins | 25.61 | 5.06 | 3.20 |
| Cycloolefins | 1.17 | 4.69 | 1.47 |
| Aromatics | 0.21 | 7.73 | 16.00 |
|  | 43.98 | 23.46 | 32.50 |

It will be observed that paraffins in the 200–300° F. fraction average 48 octane numbers below the average of paraffins in the IBP–200° F. fraction. For cycloparaffins the difference is 23 numbers, while for olefins it is 41 numbers. Thus, if excessive low-boiling aliphatic material is taken overhead the light catalytic gasoline will have a greatly reduced octane number. Conversely, if too much light material is retained in the bottoms, additional catalytic reforming capacity will be needed to process the larger volume of raffinate, and moreover the expensive reforming operation would be applied to materials which already have a sufficiently high octane number.

The debutanized light catalytic gasoline distilled overhead from splitter fractionator 4 passes in vapor form through line 6 and is condensed in condenser 8 and transferred to overhead receiver 10. A reflux stream representing two-thirds of the overhead condensate (for 2:1 reflux ratio) is pumped via line 12 back to splitter fractionator 4 to serve as reflux, while the debutanized light catalytic gasoline is obtained as a product through line 14. This light gasoline has a 95.9 octane number, research clear, and is recovered in a quantity of 8400 barrels per day, representing 42 volume percent of total catalytic gasoline. It has an ASTM boiling range of 86–206° F. and an API gravity of 79.5, with a Reid vapor pressure of between 15 and 16. It contains 1.9% aromatics by volume, 58.9% olefins, and 39.3 saturates. It may be immediately blended with other high octane gasoline blending stocks obtained throughout the rest of the process or may be separately transferred to storage.

Meanwhile, the heavy catalytic gasoline containing high boiling aromatics and high boiling saturates including very low octane number paraffins is withdrawn from splitter fractionator 4 through line 16, and transferred to reboiler 18, where a part thereof is vaporized and returned through vapor line 22 to fractionator 4. Another part, the heavy catalytic gasoline which is thereafter to be subjected to extraction, is pumped via line 22 to extractor tower 24 in a quantity of 11,600 barrels per day, or 58 volume percent of total catalytic gasoline. The heavy catalytic gasoline has an ASTM boiling range of 200 to 408° F., and an initial boiling point on the true boiling curve of 105° F. Its octane number, research clear, is 92.6. It contains 41.3 volume percent aromatics, 25.3% olefins and 34.6% saturates. This stream is at a temperature of 245° F., although the temperature may be higher if splitter fractionator 4 is operated at elevated pressure.

In extractor 24, the heavy catalytic gasoline is subjected to selective extraction to remove an aromatics rich extract from a low octane predominantly aliphatic raffinate.

Solvents and solid adsorbents which are selective for removing aromatics from a mixture of aromatics with aliphatics are generally well known in the art and no detail listing will be furnished herein. Such publications as U.S. Patent 2,364,517 and Saunders, I. & E. Chem., vol. 43, p. 121 (1951), enumerate several suitable solvents such as furfural, sulfur dioxide, phenol, cresylic alcohol, chlorex, and the alkylene glycols. Of these, the alkylene glycols typified by ethylene glycol, diethylene glycol, propylene glycol, dipropylene glycol, triethylene glycol and tripropylene glycol are especially preferred since they posses both high selectivity and high capacity for aromatics, a combination which is not present in all selective solvents. A further advantage of the alkylene glycols is that their selectivity toward cycloolefins and normal olefins may be varied by changing the concentration of water in the selective solvent; in general, the addition of from about 3 to 10% water to an alkylene glycol renders normal olefinic materials less soluble in the glycol. Among the alkylene glycols it is preferred to use triethylene glycol because of its high solvent power and good selectivity. Another advantage is its high incipient decomposition temperature of 403° F., which is substantially higher than even its homolog diethylene glycol, which begins to decompose at 327° F.

The conditions obtaining in extractor 24 will vary considerably depending on the nature of the extractive solvent. Where triethylene glycol is employed, and the extractor contains forty actual stages, a volumetric solvent-to-heavy-catalytic-gasoline ratio of about 16:1 and an aromatics extract ratio of about 7:1 with an extractor top temperature of 350° F. and bottom temperature of 315° F. serves to resolve the heavy gasoline into approximately 4640 barrels per day of raffinate gasoline having a 65 octane number and 6560 barrels per day of extract gasoline having an octane number of 99.8 research clear. Extractor 24 may be a vertical column having a plurality of grids or distribution plates or may, as preferred in small units, be a York-Scheibel type extraction tower where the charge stock and extract reflux are intimately contacted with triethylene glycol in a plurality of stages, each stage consisting of an agitation zone equipped with a turbine impeller, and stainless steel wire mesh packed disengaging zones between each of the agitation zones. The heavy catalytic gasoline enters extractor 24 through line 22 near the middle of extractor 24 and flows upward countercurrent to the falling glycol, which is introduced at a point near the top of extractor 24. Being lighter than the selective solvent, it rises and is countercurrently scrubbed by the descending stream of triethylene glycol supplied through line 34. As the aromatics are dissolved into the glycol phase, the raffinate rises and leaves extractor 24 via line 26. It is cooled to about 100° F. in cooler 28 which may optionally include a heat exchange cooling with the debutanized catalytic gasoline supplied to the process via line 2. The raffinate passes to settler 30, where entrained glycol solvent settles and is decanted via line 32 and returned to extractor 24, while the bulk of the raffinate gasoline is withdrawn and sent through line 40 to water wash tower 42, which may be packed with Raschig rings or Berl saddles or the like, where entrained or dissolved glycol is scrubbed from the gasoline by a countercurrent descending stream of water supplied through line 44 and withdrawn through line 46.

If desired, a portion of the withdrawn water may be recycled to line 44 for reuse in treating the gasoline. The water washed raffinate gasoline is withdrawn through valved line 48 or 50 at a rate of 5040 barrels per day. It has an octane number of 71.4, research clear, and represents 43.5 volume percent of the heavy catalytic gasoline charged to extractor 24.

Returning to extractor 24, the descending triethylene glycol stream intimately contacts the ascending heavy catalytic gasoline charge and removes a predominantly aromatic fraction. Since for efficient operation it is desired to operate the extractor to give as sharp a separation between aliphatics and aromatics as possible, the sharpness of separation is increased by separating the triethylene glycol-aromatics stream in solvent stripper 52 and refluxing about 7 volumes of aromatic extract to extractor 24 via line 38 for each volume of extract gasoline product. To describe the extract recovery system in more detail, the triethylene glycol-aromatics stream is withdrawn from extractor 24 and sent via line 36 (and optimally a heat exchanger where it exchanges heat with the recycle solvent stream of line 34) to solvent stripper 52, a fractionating tower equipped with both a reboiler system 70, 72, and 74, and an inlet for direct steam injection. Stripper 52 is operated at essentially atmospheric pressure. Steam, in the amount of about 0.5 pound per gallon of solvent, is employed to effectively strip the higher boiling aromatics from the triethylene glycol without attaining temperatures above 400° F. where decomposition of the glycol might take place. It will be recalled that some of the heavy aromatics fraction in the gasoline boils somewhat above 400° F. In solvent stripper 52, the solvent is taken as a bottoms via line 34 and recycled to the top of extractor 24, while the overhead comprising extract gasoline and water with a small amount of triethylene glycol is condensed by cooler 56 and conducted to receiver-separator 58. In receiver-separator 58, two liquid phases form; the lighter being extract gasoline while the heavier is essentially water. This water phase is refluxed through line 66 back to solvent stripper 52.

The extract gasoline obtained via line 62 and line 38 from receiver-separator 58 is in part refluxed to extractor 24, while the extract gasoline product is withdrawn through line 62 to product, the flow being controlled by interface level controller 60 in receiver-separator 58. This extract gasoline has an octane number of 99.8 research clear and is recovered in a yield of 6560 barrels per day, or 32.8 volume percent of extractor 24 charge. Thus it is an extremely high octane blending stock quite desirable for blending into premium motor fuels.

In Table II below the several yields and compositions are presented in summary form. Starting from a 94.0 octane gasoline, the process is shown capable of producing 74.8 volume percent of 97.3 octane blend stock, in addition to 25.2% of 71.4 octane number aliphatic raffinate. With catalytic hydroforming of the raffinate, a 92.4 volume percent yield of 97.8 octane number blend stock is achieved.

TABLE II

*Summary of yields and compositions*

| | Total Debutanized Gasoline | | | | | Blends | | |
|---|---|---|---|---|---|---|---|---|
| | Total | Overhead Fraction | Bottoms Fraction | | | Extract plus Overhead | Reformed Raffinate | Extract plus Overhead plus Reformed Raffinate |
| | | | Total | Raffinate | Extract | | | |
| Yield, vol. percent | 100.0 | 42.0 | 58.0 | 25.2 | 32.8 | 74.8 | 17.6 | 92.4 |
| Research Octane (CFR-R) | 94.0 | 95.9 | 92.6 | 71.4 | 99.8 | 97.3 | 100.0 | 97.8 |
| Composition, vol. percent: | | | | | | | | |
| Saturates | 35.7 | 39.3 | 34.6 | 64.4 | 10.7 | 26.8 | | |
| Olefins | 38.7 | 58.9 | 24.1 | 32.3 | 20.7 | 42.2 | | |
| Aromatics | 25.6 | 1.9 | 41.3 | 3.3 | 68.6 | 31.0 | | |

Several alternate processing variations are available in lieu of steam stripping and fractional distillation for recovering the aromatic extract gasoline from the triethylene glycol-aromatics extract phase. For example, rather than operate solvent stripper 52 at atmospheric pressure, it may be operated under a relatively low vacuum which permits substantiallly reduced—or even eliminated—stripping steam requirements. However an especially advantageous method of separating the aromatics from the triethylene glycol solvent is described in Georgian patent U.S. 2,727,848. According to this latter method, the glycol-aromatics stream is contacted with a liquid hydrocarbon oil which is essentially immiscible in the glycol but is miscible with the aromatic hydrocarbons, in an amount sufficient to remove the aromatic hydrocarbons essentially completely from the glycol-aromatic solution. The liquid hydrocarbon oil has a boiling range markedly different from the boiling range of the extract aromatics in order that the aromatics may be readily separated from the hydrocarbon oil by simple distillation. As an example of such liquid hydrocarbon oil, an acid treated kerosene having an ASTM distillation boiling range of 512–614° F. and containing about 9 volume percent of aromatic hydrocarbons is employed to scrub out the extract gasoline. Approximately one volume of this kerosene is used for every four volumes of glycol-aromatic solution. By this embodiment, the glycol temperature need never exceed 275–300° F., irrespective of the particular glycol selected, and as a consequence it is convenient to use glycols such as diethylene glycol which have a lower decomposition temperature than triethylene glycol. After kerosene scrubbing, the kerosene-aromatic extract phase is fractionally distilled to separate and recover the aromatics as an overhead product while the kerosene is recycled to aromatics scrubbing.

The 5040 barrels per day of 71 octane number raffinate gasoline may be processed in any one of several ways. It may simply be withdrawn through valved line 48 and employed in usages requiring or desiring a highly aliphatic hydrocarbon. The raffinate gasoline may be blended into housebrand gasoline, or used alone as housebrand. It is especially adaptable for blending into jet fuels, as shown in Table III below. For this purpose blending with virgin naphtha is required for the reason that the raffinate is highly olefinic, i.e. has a high bromine number, and by itself could not meet the JP–4 bromine number specification. It is observed that the final jet fuel blend may contain more than 50% of raffinate gasoline.

Where a refinery is to operate for maximum premium gasoline production, the aliphatic raffinate may be catalytically reformed in the presence of hydrogen gas and a catalyst effective to dehydrocyclize paraffins, for the purpose of upgrading the octane number of this stock. The attached Figure 1 shows two processing options, either or both of which may be employed depending on the refinery octane picture. In one embodiment, the raffinate gasoline is conducted through valved line 50, and through valved line 102 (valved lines 76 and 108 being closed) where it is blended with virgin naphtha and conducted via line 106, charge pump 110, line 112, furnace 114 and line 116 to a catalytic reforming zone 118. Blending with virgin naphtha prior to reforming is highly desirable since olefinic materials such as those contained in the raffinate gasoline are thermally unstable in high concentrations and might tend to form coke if heated alone. A stream of recycle hydrogen gas through line 132 is admixed with the naphtha and raffinate gasoline in line 112 and supplies a hydrogen atmosphere for the reforming.

Reforming zone 118 is shown symbolically in Figure 1, but it will be appreciated by those skilled in the art that reforming zone 118 generally comprises a plurality of serially connected fixed or fluidized beds with interstage reheater furnaces for the purpose of maintaining a relatively high average reforming zone temperature despite the high endothermic heat of reaction. Catalysts effective for dehydrocyclizing paraffins are preferably the platinum-alumina type, such as platinum-alumina, platinum-silica-alumina and palladium-alumina, but may include or consist of alkalized chromia-alumina or the like. These catalyst beds may be operated either non-regeneratively at pressure in the range of about 200–1000 p.s.i.g., or regeneratively at pressure of 0–300 p.s.i.g., the average catalyst temperature ranges in each case being about 850–1050° F. The effluent stream is withdrawn from reforming zone 118, conducted through transfer line 120, cooled by reactor product cooler 122, and transferred to separator 124. There the hydrogen containing gas is withdrawn overhead through line 126 and compressed by compressor 128 and thereafter recycled through lines 130 and 132 back to preheater furnace 114. The net excess hydrogen is vented by pressure control through vent line 138. Unstabilized reformate from separator 124 is pumped through line 136 to stabilizer 140, a multiple plate fractional distillation column, where light materials

TABLE III

*Inspection data on jet fuel blends of raffinate with virgin JP–4*

| Composition, vol. percent: | JP–4 Specs. | | | | | | |
|---|---|---|---|---|---|---|---|
| JP–4 jet fuel | | 100 | 90 | 80 | 70 | 50 | — |
| Raffinate product | | — | 10 | 20 | 30 | 50 | 100 |
| RVP, p.s.i. | 2.0–3.0 | 2.6 | 2.3 | 2.4 | 2.2 | 2.0 | 1.5 |
| ASTM distillation, ° F.: | | | | | | | |
| IBP | | 154 | 170 | 150 | 168 | 172 | 208 |
| 10% | 250 max | 233 | 230 | 226 | 230 | 226 | 235 |
| 30 | | 309 | 299 | 291 | 286 | 274 | 263 |
| 50 | | 364 | 355 | 347 | 335 | 320 | 292 |
| 70 | | 418 | 407 | 400 | 388 | 369 | 328 |
| 90 | 550 max | 470 | 461 | 461 | 449 | 431 | 372 |
| FBP | | 519 | 517 | 505 | 508 | 504 | 419 |
| Loss, vol. percent | 1.5 max | 1 | 1 | 1 | 1 | 1 | 1 |
| Residue, vol. percent | 1.5 max | 1 | 1 | 1 | 1 | 1 | 1 |
| Bromine number, cg./g. | 30 max | 1.3 | 5.6 | 10.0 | 15.0 | 24.0 | 49.0 |
| 16-Hr. accelerated gum, mg./100 ml | 20 max | 1.1 | 4.4 | 11.1 | 10.3 | 16.1 | 483.8 |
| Air jet gum at 400° F., mg./100 ml | 10 max | 0.2 | 1.0 | 0.2 | 3.4 | 1.2 | 15.0 |
| Freezing point, ° F. | –76 max | –90 | –94 | –94 | –96 | –105 | –152 |
| Water Tolerance | pass | OK | | OK | OK | | OK |
| "Air-Well" corrosion | pass | OK | | OK | | | OK |
| Smoke point, mm | | 22 | 23 | 23 | 25 | 26 | 33 | are withdrawn overhead through reflux and light product system comprising line 142, condenser 144, receiver 146, reflux line 148, and light product line 150, while the stabilized reformate is taken through line 158. In the usual manner, lines 152 and 156 and reboiler 154 are employed to reboil the gasoline. The catalytically reformed raffinate typically has an octane number of about 100 and is obtained in a 70% yield on raffinate feed, although these may be much lower or higher depending on the particular processing conditions employed in reforming zone 118. The reformed raffinate may be stored separately or blended with the light catalytic gasoline derived through line 14 and/or with the octane number extract gasoline obtained from the process via line 62.

As an alternate to reforming the raffinate gasoline in the presence of virgin naphtha, or optionally as an adjunct to such reforming, the raffinate gasoline may be subjected to catalytic hydrogenation for the purpose of hydrogenating olefins and for destructively hydrogenating sulfur compounds to form hydrogen sulfide gas, normally a reforming catalyst activity depressant.

An optional olefin hydrogenation zone is shown in Figure 1. Raffinate gasoline from line 50 is passed into the hydrogenation zone via valved line 76 (valved line 102a being closed) and charged by pump 78 to preheater 80. A recycle stream of hydrogen-containing gas joins the raffinate gasoline before the preheater and is heated therewith. The commingled vapor stream is conducted from preheater 80 through line 82 to reactor 84 where a sulfur resistant hydrogenation catalyst acts to hydrogenate normal olefins to paraffins, cycloolefins to naphthenes, and sulfur containing compounds to hydrogen sulfide gas and the corresponding saturated hydrocarbon residue. Olefin hydrogenation catalysts are well known in the art, and may be typified by such materials as nickel-tungsten sulfide, cobalt molybdate, etc. Olefin hydrogenation conditions may be within the range of 100–1500 p.s.i.g., and temperatures of from 100 to about 800° F. Because olefins in general have higher octane numbers than the corresponding saturates, the hydrogenated raffinate has a lower octane number than the raw raffinate.

The effluent from hydrogenation reactor 84 is sent through line 86 and condenser 88 to separator 90, where uncondensed hydrogen-containing gas is withdrawn through line 92 and sent via line 96 to recycle gas compressor 98 for ultimate recycle through line 100 to the process. Excess gas is vented through line 94. The liquid product is sent from separator 90 via valved line 108 to the catalytic reforming zone; optionally and desirably, this liquid is treated by such means as by caustic scrubbing or distillation for removal of dissolved hydrogen sulfide gas prior to hydroforming.

When an olefin hydrogenation system is provided, hydrogen requirements are supplied by the use of excess hydrogen gas obtained from catalytic reforming zone 118. To supply this hydrogen gas, valve 134a in line 134 is opened and vent line 138 from reforming zone separator 124 is closed off. Pressure control on reforming zone 118 is thus established by venting excess gas via valved line 134 by means of pressure control valve 134b, and the vent gas is supplied to the suction side of olefin hydrogenation zone recycle gas compressor 98. Excess hydrogen containing gas is vented from olefin hydrogenation zone separator 90 by vent line 94.

Figure 2:
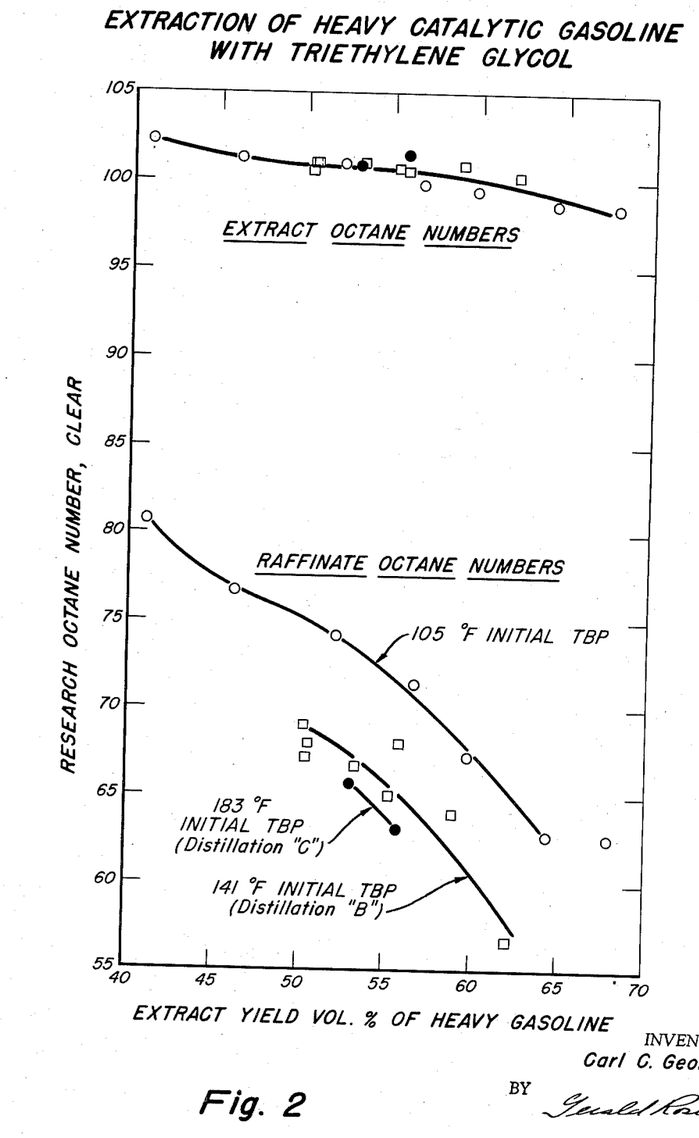
Figure 2 shows the correlation between extract and raffinate research octane number (CFR–R, clear) as a function of extract yield.

Thus the process of the instant invention has been shown to be highly attractive from a cost and processing standpoint. The selection of operating variables however are considered with regard to Figures 2 and 3, which respectively relate the octane numbers of various streams as a function of the volumetric quantity of these streams. Attention is directed to Figure 2, showing the octane numbers of the extract plus raffinate as a function of the volume percent of heavy naphtha charge which is withdrawn as an extract. For most efficient operation, it is desired to concentrate all low octane number paraffins in the raffinate while realizing maximum octane numbers in the light catalytic gasoline separated as an overhead in splitter 4 and in the extract gasoline. On the other hand, considering only the extraction of heavy catalytic gasoline, as a larger quantity of extract is obtained the raffinate octane number decreases but the extract octane number also decreases because of the inevitable retention of some low octane aliphatics in the extract. It has been found that there is a very precise limit beyond which additional extraction tends to put some low octane aliphatics in the extract, and these have exceedingly low—and even negative—blending octane numbers. With careful operation of extractor 24, i.e. a large number of extraction stages and sufficient solvent: feed and extract reflux ratios, a sharp fractionation of the type shown in Figure 2 can be realized. At 40 volume percent extract, the raffinate has an octane number of about 81 while the extract has an octane number of about 103, for a gap or octane spread of 21. The spread gradually widens as more extract is taken, and at about 55 volume percent the gap begins to widen even more appreciably. At about 65% and higher extract yields, the raffinate has an octane number of about 63—a drop from 83—while the extract has dropped only to 99, for a spread of 36 octane numbers. It is most desirable to operate in the 50–65 volume percent yield region since this makes for more extract yields of only slightly reduced octane number, while the high boiling paraffins which require disproportionately larger quantities of ethyl fluid for octane upgrading are rejected to the raffinate.

Figure 3:
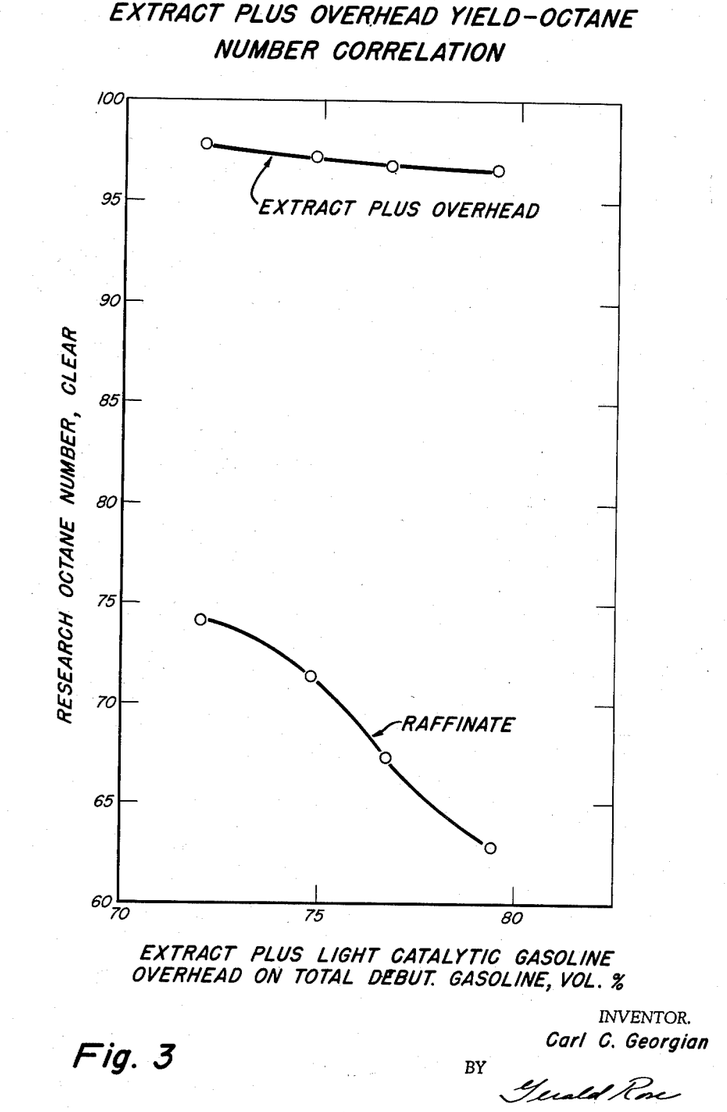
Figure 3 correlates the raffinate and extract-plus-overhead octane numbers as a function of extract plus overhead (light catalytic gasoline) yield.

Turning now to Figure 3, the data of Figure 2 is replotted to show, in the top curve, the octane number of blends of the entire light catalytic gasoline overhead stream with all the extract, again as a function of the extract plus light catalytic gasoline yield based on total debutanized gasoline. The upper curve may be considered the "yield-octane" curve of the instant process without catalytic hydroforming of the raffinate. It will be observed that the octane number of the extract plus overhead fractions remains essentially constant at about 97 octane number over the range of about 73 volume percent yield and higher.

Figure 4:
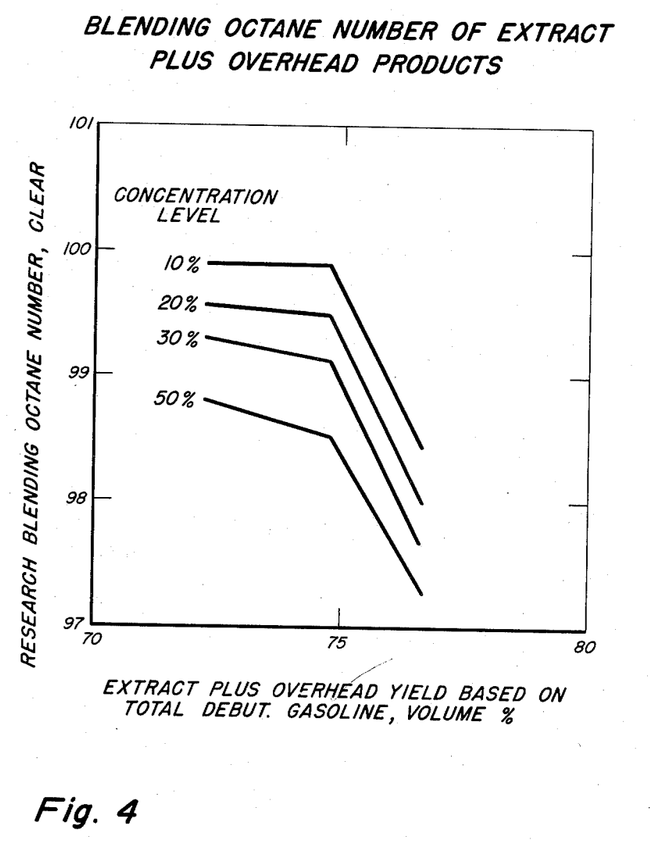
Figure 4 correlates the blending octane number of a mixture comprising the extract plus light catalytic gasoline fractions as a function of yield based on the total catalytic gasoline charged.

Figure 4 however shows the blending octane number, rather than the independent octane number, of the light catalytic gasoline plus extract gasoline in a 10 pound Reid vapor pressure (RVP) base stock comprising 63.8 volume percent of raw debutanized catalytic cracked gasoline, 18.6 volume percent naphthenic hydroformate, 10.9 volume percent light polymer gasoline, and 6.7 volume percent n-butane. The base stock has an ASTM distillation of 95–408° F. and an octane number of 93.4. It will be observed from Figure 4 that the blending octane number of the extract plus overhead in this base stock breaks off extremely sharply at 75 volume percent yield for all concentration levels in the base stock. For this reason, the operation of splitter fractionator 4 and solvent extractor 24 are correlated so as to produce preferably no more than about 77 volume percent, and optimally no more than about 75 volume percent, debutanized light catalytic gasoline plus extract gasoline based on total feed. At yields above 75%, the blending octane number falls off considerably due to a blending octane antagonism contributed by high-boiling aliphatics, and full advantage of the instant process is not attained.

To provide a design basis for the commercial plant described hereinbefore, three sets of pilot plant runs were

TABLE IV

*Fractionation of debutanized catalytic cracked gasoline*

[Crude oil characteristics: 643° F. volumetric average boiling point; 11.63 Watson "K" factor; 27.8 gravity; "naphthenic"]

| Catalytic Cracked Gasoline | Deb. Cat. Gaso. | Light Cat. Gaso. | Heavy Cat. Gaso. |
|---|---|---|---|
| Volume Percent | 100 | 42 | 58 |
| Gravity, °API | 57.4 | 79.5 | 44.2 |
| RVP, p.s.i.g | 8.2 | 15.4 | 1.2 |
| ASTM Distillation, °F.: | | | |
| IBP | 106 | 86 | 200 |
| 10 | 128 | 96 | 234 |
| 30 | 164 | 108 | 285 |
| 50 | 218 | 120 | 292 |
| 70 | 288 | 136 | 328 |
| 90 | 362 | 166 | 364 |
| FBP | 406 | 206 | 408 |
| TBP Distillation—Vol. percent Below 200° F | | | 12.6 |
| Initial Boiling Point | | | 105 |
| Octane Number: | | | |
| Research, Clear | 94.0 | 95.9 | 92.6 |
| Motor, Clear | 80.7 | 80.9 | 80.7 |
| Component Analysis (FIA): | | | |
| Aromatics, Vol. percent | 25.6 | 1.9 | 41.3 |
| Olefins | 38.7 | 58.9 | 25.3 |
| Saturates | 35.7 | 39.3 | 34.6 |
| Composition, Vol. percent: | | | |
| i-$C_4$ | 0.7 | 1.3 | |
| i-$C_4=$ | 0.6 | 1.1 | |
| 1-$C_4=$ | 0.4 | 1.0 | |
| 2-$C_4=$ | 1.8 | 3.7 | |
| n-$C_4$ | 0.8 | 1.9 | |
| i-$C_5$ | 9.9 | 21.4 | |
| $C_5=$ | 9.4 | 24.7 | |
| n-$C_5$ | trace | trace | |
| $C_{6+}$ | 76.4 | 44.9 | | conducted. In the first set, exemplified by the description of the commercial plant, a debutanized (actually containing 4.3 volume percent butane-butylenes) catalytic gasoline having a boiling range of 106 to 406° F., and obtained by catalytic cracking of a naphthenic crude oil having a Watson K-factor of 11.63, was prefractionated into a light catalytic gasoline overhead and a heavy catalytic gasoline bottoms. The product inspections, as well as analyses of the original debutanized catalytic gasoline, are presented in Table IV for this stock.

It will be observed that the fractionation was relatively inefficient, with approximately 12.6 volume percent of low boiling material remaining in the heavy catalytic gasoline which is to be subjected to selective extraction. Fractionation to separate light and heavy fractions at a cut point as closely as possible to 200° F. would have been more desirable since it would have reduced the volume of charge stock fed to the extraction unit and also would not subject relatively high octane number low boiling aliphatics to expensive and wasteful rejection to raffinate.

The above heavy catalytic gasoline was subjected to seven different solvent extraction runs conducted at various solvent ratios, aromatic extract reflux ratios, and extraction temperatures to define the curves presented in Figures 2 and 3. These conditions were varied progressively from a solvent:feed ratio of 10:1 in run 1 to a ratio of 35:1 in run 7, while the reflux ratios were generally kept between 8 and 13. The extraction tower top and bottom temperatures were held in the ranges of 295–330° and 265–320° F., respectively. Since the optimum conditions will vary somewhat with feed composition, precise enumeration of the specific processing temperatures and flows for the ensuing runs are not shown. With reference to the yield data in Table V below, those skilled in the art may readily estimate the approximate extraction conditions for any gasoline to achieve the desired separation while at the same time not exceeding about 75–77 volume percent light gasoline plus extract yield which would otherwise detrimentally effect the blending octane number of the fractions. Generally, higher solvent:feed ratios and higher extraction temperatures increase the volume of extract, while higher reflux ratios improve the sharpness of extraction but decrease the volume of extract.

Based on heavy catalytic gasoline charged to the extractor, the extract yields from the seven runs varied from 41 volume percent of 102.3 octane fuel, to 68 volume percent of 98.6 octane. Extract plus light catalytic gasoline overhead octanes ranged from 97.8 at 72.2% (on total debutanized gasoline) to 96.8 at 76.7 volume percent yields.

A typical blend of light catalytic gasoline and extract gasoline obtained from the above runs is subjected to ASTM distillation in order to determine its volatility characteristics. As is conventional, the temperature at which 65% of the gasoline distills is considered as an approximate measure of fuel volatility. The data are

TABLE V

*Solvent extraction of heavy catalytic gasoline*

| Run Number | 1 | | 2 | | 3 | | | 4 | | | 5 | | | 6 | | | 7 | |
|---|---|---|---|---|---|---|---|---|---|---|---|---|---|---|---|---|---|---|
| Product Description [1] | R | E | R | E | R | E | E+O | R | E | E+O | R | E | E+O | R | E | E+O | R | E |
| Yield, vol. percent | | 41.0 | | 46.1 | | 52.1 | 72.0 | | 56.6 | 74.8 | | 59.8 | 76.7 | | 64.4 | 79.4 | | 68.0 |
| Research Octane No | 80.8 | 102.3 | 76.7 | 101.3 | 74.2 | 101.0 | 97.8 | 71.4 | 99.8 | 97.2 | 67.3 | 99.5 | 96.8 | 62.8 | 98.7 | 96.6 | 62.7 | 98.6 |
| Motor Octane No | 74.2 | 90.3 | 72.8 | 88.8 | 70.6 | 86.8 | 83.3 | 70.8 | 86.0 | 82.7 | 64.3 | 85.2 | | 63.2 | 85.4 | 8.30 | 61.2 | 84.7 |
| Research ON of E+O in 93.4 ON Basestock: | | | | | | | | | | | | | | | | | | |
| 10% | | | | | | | 94.1 | | | 94.0 | | | 93.8 | | | | | |
| 20% | | | | | | | 94.6 | | | 94.8 | | | 94.3 | | | | | |
| 30% | | | | | | | 95.1 | | | 95.2 | | | 94.6 | | | | | |
| 50% | | | | | | | 96.1 | | | 95.9 | | | 95.3 | | | | | |
| Aromatics, vol. percent | | | | | | 4.3 | 74.7 | 32.3 | 3.3 | 68.6 | 31.1 | 4.4 | 63.7 | 30.0 | 2.6 | 59.0 | 28.8 | |
| Olefins, vol. percent | | | | | | 33.5 | 17.3 | 41.5 | 32.3 | 20.7 | 42.2 | 29.9 | 23.7 | 43.0 | 25.9 | 24.8 | 42.8 | |
| Saturates, vol. percent | | | | | | 62.2 | 8.0 | 26.2 | 64.4 | 10.7 | 26.8 | 65.7 | 12.2 | 27.0 | 71.6 | 16.3 | 28.4 | |
| Research ON of R in Housebrand (10.2 RVP, 87 O.N. Research) at 3.0 cc. TEL/gal.: | | | | | | | | | | | | | | | | | | |
| 10% | | | | | | 87.4 | | | 87.7 | | | 86.9 | | | | | | |
| 20% | | | | | | 87.8 | | | 87.7 | | | 86.9 | | | | | | |
| 30% | | | | | | 88.1 | | | 88.1 | | | 86.8 | | | | | | |
| 100% | | | | | | 90.1 | | | 88.9 | | | 86.9 | | | | | | |
| Bromine number, cg./gm | | | | | | 52 | 37 | | 42 | 40 | | 41 | 43 | | 39 | 47 | | 35 | 47 |
| Maleic Anhydride Value, mg./gm | | | | | | 2 | 8 | | 8 | 6 | | 0.7 | 9 | | 0.7 | 7 | | 1.0 | 8 |
| Total Sulfur, wt. percent | | | | | | 0.022 | 0.142 | | 0.023 | 0.137 | | 0.021 | 0.072 | | 0.021 | 0.083 | | 0.019 | 0.101 |
| Aniline point (mixed), °F | | | | | | 137 | 72 | | 133 | 76 | | 139 | 78 | | 143 | 79 | | 147 | 86 |

Figure 5:
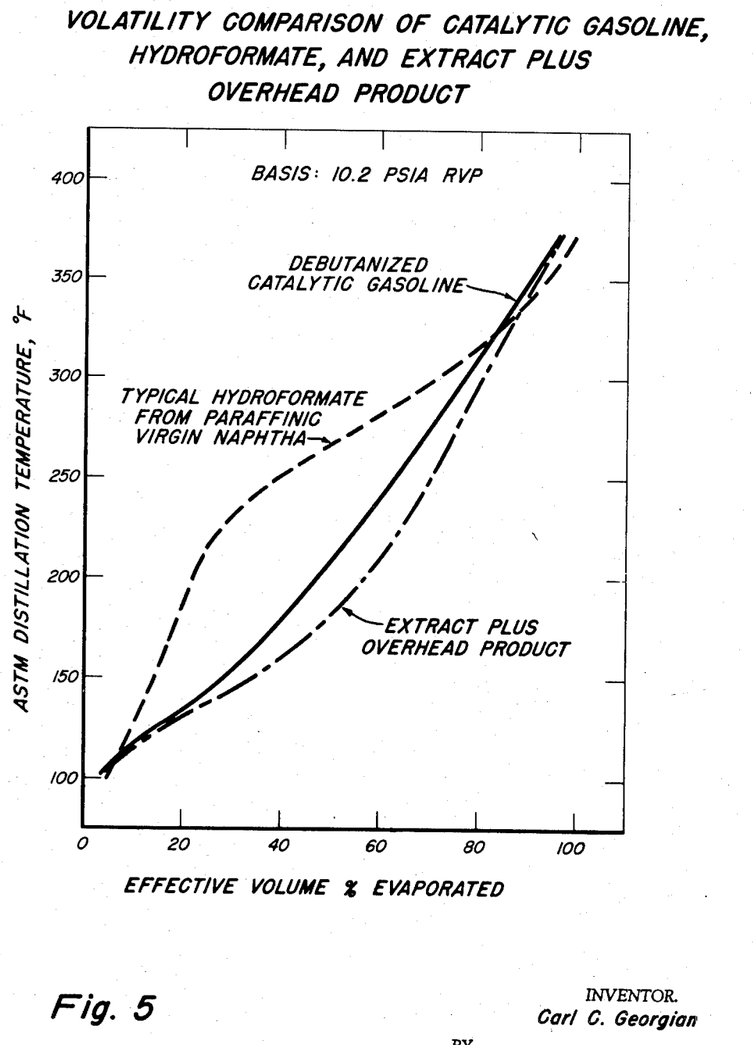
Figure 5 compares the volatility of the extract plus overhead product with the original debutanized catalytic gasoline and with a typical hydroformed virgin naphtha.
Figure 6:
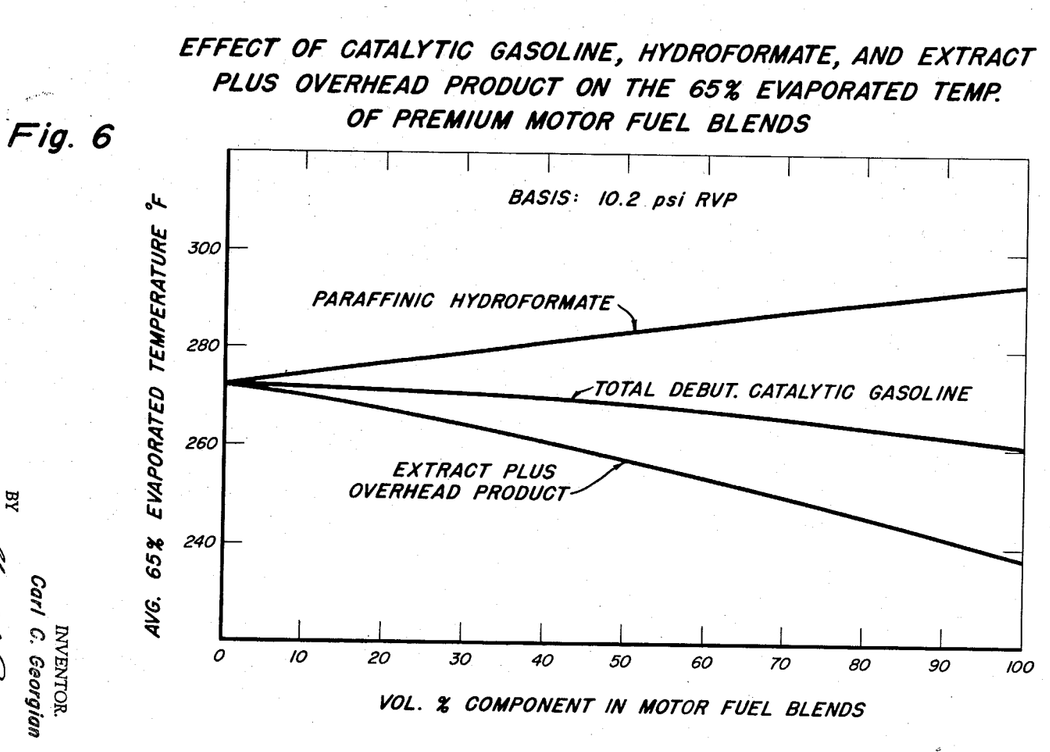
Figure 6 shows the volatility of Figure 5 gasolines when blended into premium motor fuels.

[1] R=raffinate; E=extract; E+O=extract+overhead.
E yield based on vol. percent of R+E. E+O yield based on R+E+O.

presented in Figure 5 where they are compared with hydroformed virgin naphtha and with the original catalytic cracked gasoline. All three stocks have approximately identical 10 pound RVP vapor pressures and have almost identical ASTM distillation initial and final boiling points. It will be seen from this figure that the blend of light catalytic gasoline and extract gasoline obtained in the process described herein has volatility characteristics which are superior to the debutanized catalytic gasoline originally charged to the process, and are far superior to the characteristics of hydroformed gasoline. The average 65% temperature of premium blends comprising 50% of base stock and 50% of the blends described in Figure 5 are shown in Figure 6. It can be seen from this figure that the average 65% temperature of a premium blend containing 50% of the extract plus overhead product is 12° F. and 25° F. lower than similar premium blends containing respectively total debutanized catalytic gasoline and hydroformate from paraffinic virgin naphtha. Translated into vehicle performance, these data indicate that an automobile will warm up one to two minutes faster when using a premium gasoline containing extract plus overhead than with similar gasolines. Thus with crude oils plagued by gasoline fractions having low volatility, such as California crudes, the process of the instant invention is particularly suitable since it permits the obtention of good volatility properties in high octane motor fuels.

Two additional sets of runs were made with different feedstocks obtained from a crude oil characterized as "paraffinic." Motor fuels obtained from paraffinic crudes characteristicly have low research octane numbers, and for this reason refiners of paraffinic crudes are faced with the problem of meeting octane specifications, although the volatility problem is not so severe as with naphthenic or aromatic crudes. Debutanized catalytic gasoline obtained from the paraffinic crude was fractionated at two different cut points, and the inspections of the respective fractions are shown as "Distillation B" and "Distillation C" in Table VI below.

TABLE VI

*Fractionation of debutanized catalytic gasoline*

Feed characteristics:
VABP, °F________________________________ 614
Watson K-factor__________________________ 11.62
Gravity, °API____________________________ 29.1

DEBUTANIZED GASOLINE AND PREFRACTIONATED PRODUCT CHARACTERISTICS

|  | Debut | Distillation "B" | | Distillation "C" | |
| --- | --- | --- | --- | --- | --- |
|  |  | Ovhd. | Btms. | Ovhd. | Btms. |
| Gravity, °API | 55.9 | 81.6 | 44.0 | 79.9 | 42.5 |
| RVP, p.s.i.g. | 8.1 | 14.2 |  |  |  |
| ASTM Distillation, °F.: |  |  |  |  |  |
| IBP | 104 | 84 | 205 | 90 | 256 |
| 10% | 130 | 94 | 230 | 99 | 258 |
| 30% | 170 | 104 | 268 | 111 | 280 |
| 50% | 230 | 144 | 300 | 122 | 304 |
| 70% | 300 | 126 | 335 | 152 | 334 |
| 90% | 360 | 154 | 376 | 173 | 376 |
| FBP | 406 | 204 | 420 | 220 | 412 |
| Vol. Percent Boiling Below 200° F. on TBP Curve |  |  | 10 |  | 6 |
| IBP on TBP Curve, °F |  |  | 141 |  | 189 |
| Yield, Vol. Percent | 100 | 37.3 | 62.7 | 41.9 | 58.1 |
| Octane Number: |  |  |  |  |  |
| Research | 93.1 | 96.0 | 91.4 | 96.0 | 91.0 |
| Motor | 80.0 | 81.5 |  | 79.5 | 79.7 |
| Component Analysis (FIA), Vol. Percent: |  |  |  |  |  |
| Aromatics | 23.8 | 2.1 |  | 3.3 | 42.9 |
| Olefins | 32.3 | 56.1 |  | 52.5 | 20.7 |
| Saturates | 43.9 | 41.8 |  | 44.3 | 36.3 |

It will be noted that in Distillation B a heavy catalytic gasoline bottoms having a boiling range somewhat higher than that fractionated from the previous example was obtained; the initial boiling point on the true boiling point curve is 141° F. and only 10% boils below 200° F. The bottoms from "Distillation C" represents even a more desirable fractionation. This bottoms has an initial boiling point of 189° F. and contains only 6% of lighter material boiling below 200° F., yet nonetheless the overhead fraction has the same 96 octane as the overhead from Distillation B. Results of subjecting both bottoms individually to selective extraction with triethylene glycol are shown in Table VII below.

TABLE VII

*Solvent extraction of heavy catalytic gasoline after Distillations "B" and "C"*

|  | B | | B | | B | | B | | B | |
| --- | --- | --- | --- | --- | --- | --- | --- | --- | --- | --- |
|  | Extr. | Raff. | Extr. | Raff. | Extr. | Raff. | Extr. | Raff. | Extr. | Raff. |
| Yield Data: Vol. Percent | 50.3 |  | 50.4 |  | 50.5 |  | 53.2 |  | 55.2 |  |
| Octane Data: |  |  |  |  |  |  |  |  |  |  |
| Research Clear | 100.6 | 69.0 | 101.0 | 67.2 | 101.0 | 68.0 | 101.0 | 66.7 | 100.7 | 65.0 |
| Research+1 cc. TEL/gal |  |  |  |  |  |  |  |  |  |  |
| Research+3 cc. TEL/gal |  |  |  |  |  |  |  |  |  |  |
| Motor Clear |  |  |  |  |  |  |  |  |  |  |
| Inspection Data: |  |  |  |  |  |  |  |  |  |  |
| Component Anal., Vol. Percent— |  |  |  |  |  |  |  |  |  |  |
| Aromatics |  |  |  |  |  |  |  |  |  |  |
| Olefins |  |  |  |  |  |  |  |  |  |  |
| Saturates |  |  |  |  |  |  |  |  |  |  |
| Bromine No |  |  |  |  |  |  |  |  |  |  |
| Sulfur, Wt. Percent |  |  |  |  |  |  |  |  |  |  |
| Gravity, °API |  |  | 34.8 | 54.4 | 35.0 | 54.5 | 35.4 | 54.9 | 35.9 | 55.0 |

|  | B | | B | | B | | C | | C | |
| --- | --- | --- | --- | --- | --- | --- | --- | --- | --- | --- |
|  | Extr. | Raff. | Extr. | Raff. | Extr. | Raff. | Extr. | Raff. | Extr. | Raff. |
| Yield Data: Vol. Percent | 55.8 |  | 59.0 |  | 62.2 |  | 53.0 |  | 55.7 |  |
| Octane Data: |  |  |  |  |  |  |  |  |  |  |
| Research Clear | 100.6 | 68.0 | 100.9 | 64.0 | 100.3 | 56.7 | 100.9 | 65.7 | 101.5 | 63.1 |
| Research+1 cc. TEL/gal |  |  |  |  |  | 66.3 |  |  |  |  |
| Research+3 cc. TEL/gal |  |  |  |  |  | 76.7 |  |  |  |  |
| Motor Clear | 86.2 | 67.0 | 86.4 | 62.9 | 86.7 | 54.0 |  |  |  |  |
| Inspection Data: |  |  |  |  |  |  |  |  |  |  |
| Component Anal., Vol. Percent— |  |  |  |  |  |  |  |  |  |  |
| Aromatics | 74.3 | 11.2 | 73.3 | 2.5 | 63.5 | 2.2 |  |  |  |  |
| Olefins | 15.3 | 28.0 | 16.1 | 26.9 | 21.2 | 20.4 |  |  |  |  |
| Saturates | 10.4 | 60.8 | 10.6 | 70.7 | 15.4 | 77.4 |  |  |  |  |
| Bromine No |  |  |  |  |  |  |  |  |  |  |
| Sulfur, Wt. Percent |  |  |  |  |  |  |  |  |  |  |
| Gravity, °API | 36.3 | 54.6 | 36.3 | 54.6 | 37.8 | 54.9 | 34.0 | 53.4 | 34.3 | 54.0 |

It will be observed from Figure 2 that the extract gasolines from all three fractionations have essentially the same octane numbers at identical extract yields based on heavy gasoline charged. However the raffinates have octane numbers differing by as much as seven numbers. This very clearly indicates the desirability of fractionating the debutanized catalytic gasoline feedstock as closely as possible to the 200° F. cut point so as to avoid rejecting high octane number light paraffins into the bottoms fraction where they must be subjected to relatively expensive catalytic hydroforming when in reality this operation is unnecessary.

From the foregoing discussion and examples, it is manifest that the process of the instant invention provides an extremely attractive yet economical method for producing high octane gasoline blending stocks from catalytic cracked gasoline. By fractionally distilling the cracked gasoline to obtain a light (200° F. minus) fraction and a heavy (200° F. plus) fraction the high octane number light aliphatic hydrocarbons are retained in the overhead stream as a comparatively high octane number fraction. The bottoms from distillation containing high octane number aromatics and very low octane aliphatics are subjected to solvent extraction to remove the aromatic constituents as a second high octane fraction. However, to preserve the exceptionally high blending octane numbers it is essential that the combination of light catalytic gasoline and extract gasoline not exceed about 77 volume percent of the total debutanized catalytic gasoline. The low octane aliphatic raffinate obtained herein may be blended into quality jet fuels where its aliphatic components provide desirably high heats of combustion. Alternatively, it may be subjected to catalytic hydroforming to aromatize the aliphatics, preferably after prior hydrogenation or in admixture with virgin naphtha. Perhaps one of the most important gains obtained in the process of the instant invention is the improvement in volatility characteristics of blends of light catalytic gasoline and extract gasoline, with or without hydroforming of the raffinate. The data presented clearly indicate the important achievements to be gained in volatility characteristics of the final blended motor fuels by use of the instant process.

Having described the invention, what is claimed is:

1. A process for producing high octane gasoline blending stocks from catalytic cracked gasoline which comprises fractionally distilling the cracked gasoline to obtain a light component substantially entirely boiling below 200° F. and having an octane number higher than the original catalytic cracked gasoline, and a heavy component substantially entirely boiling above about 200° F. and having an octane number lower than the original catalytic cracked gasoline, subjecting the heavy component to selective extraction to separate a high octane aromatics rich extract from a low octane predominantly aliphatic raffinate, the volume of extract plus light high octane component being not more than about 77 percent of the catalytic cracked gasoline, and the extract alone comprising at least 40 volume percent of the heavy component, and subjecting the predominantly aliphatic raffinate to catalytic hydroforming in the presence of hydrogen gas and a catalyst effective to dehydrocyclize paraffins.

2. Process of claim 1 in which the selective extraction step includes the use of an alkylene glycol solvent.

3. Process of claim 2 in which the alkylene glycol solvent comprises triethylene glycol.

4. A process of claim 1 including the step of hydrogenating olefins in the predominantly aliphatic raffinate before subjecting said raffinate to catalytic hydroforming.

5. Process of claim 1 in which the aliphatic raffinate is subjected to catalytic hydroforming while admixed with virgin naphtha.

6. Process of claim 1 in which the catalyst effective to dehydrocyclize paraffins comprises platinum on alumina.

7. A process for producing high octane gasoline blending stocks from catalytic cracked gasoline which comprises fractionally distilling the cracked gasoline to obtain a light component having an octane number higher than the original catalytic cracked gasoline and containing aliphatics boiling below n-heptane and a heavy component having an octane number lower than the original catalytic cracked gasoline and containing n-heptane and higher boiling aliphatics, subjecting the heavy component to selective extraction to separate an aromatics rich extract of higher octane number than the original catalytic cracked gasoline, and an aliphatic raffinate of lower octane number than said gasoline, and subjecting the predominantly aliphatic raffinate to catalytic hydroforming in the presence of hydrogen gas and a catalyst effective to dehydrocyclize paraffins.

8. Process of claim 7 in which the volume of extract plus light high-octane component is not more than about 75 volume percent of the catalytic cracked gasoline.

9. Process of claim 7 in which the selective extraction step includes the use of an alkylene glycol solvent.

10. Process of claim 7 in which the aliphatic raffinate is subjected to catalytic hydroforming while admixed with virgin naphtha.

11. A process for producing high octane gasoline blending stocks from a substantially debutanized catalytic cracked gasoline which comprises fractionally distilling the cracked gasoline to obtain a light component at least 90 percent of which boils below about 200° F. and having an octane number higher than the substantially debutanized catalytic cracked gasoline, and a heavy component at least 85 percent of which boils above about 200° F. and having an octane number lower than said gasoline, and subjecting the heavy component to selective extraction to separate an aromatics rich extract having a higher octane number than the debutanized catalytic cracked gasoline, and a predominantly aliphatic raffinate having a lower octane number than said gasoline.

12. Process of claim 11 in which the volume plus extract of light high-octane component is not more than about 77 percent of the debutanized catalytic cracked gasoline.

13. Process of claim 12 in which the volume of extract plus light high-octane component is not more than about 75 percent of the debutanized catalytic cracked gasoline.

14. Process of claim 11 in which the selective extraction step includes the use of an alkylene glycol solvent.

15. A process for producing high octane gasoline blending stocks from a substantially debutanized catalytic cracked gasoline which comprises fractionally distilling the cracked gasoline to obtain a light component and a heavy component having an octane number higher than the substantially debutanized catalytic cracked gasoline, having an octane number lower than said gasoline, and subjecting the heavy component to selective extraction to separate a high octane aromatics rich extract from a low octane predominantly aliphatic raffinate, the volume of extract plus light high octane component being not more than about 75 percent of the catalytic cracked gasoline, and the extract alone comprising at least about 40 volume percent of the heavy component.

16. Process of claim 15 in which the selective extraction step includes the use of an alkylene glycol solvent.

17. Process of claim 16 in which the alkylene glycol comprises triethylene glycol.

18. A process for producing high octane gasoline blending stocks from a substantially debutanized catalytic cracked gasoline which comprises splitting the cracked gasoline at a cut point of about 200° F. to obtain a light component having an octane number higher than the cracked gasoline and a heavy component having an octane number lower than said cracked gasoline, and subjecting the heavy component to solvent extraction to separate a high octane aromatics rich extract from a low octane predominantly aliphatic raffinate.

19. Process of claim 18 in which the volume of extract plus light high octane component is not more than about 75 percent of the catalytic cracked gasoline, and the extract alone comprises at least about 40 volume percent of the heavy component.

20. Process of claim 18 in which at least 90 volume percent of the light component boils below 200° F., and in which at least 85 volume percent of the heavy component boils above 200° F.

21. A process for producing high octane gasoline blending stocks from a catalytic cracked gasoline which comprises splitting the cracked gasoline at a cut point of about 200° F. to obtain a light component having an octane number higher than the original catalytic cracked gasoline and a heavy component having an octane number lower than said cracked gasoline, recovering said light component as a first high octane gasoline blending stock, subjecting the heavy component to solvent extraction with an alkylene glycol solvent to separate high octane aromatics rich extract from a low octane predominantly aliphatic raffinate, and recovering said aromatics rich extract as a second high octane gasoline blending stock.

22. Process of claim 21 wherein said low octane predominantly aliphatic raffinate is subjected to catalytic hydroforming in the presence of hydrogen gas and a catalyst effective to dehydrocyclize paraffins.

23. A process for producing high octane gasoline blending stocks characterized in having improved volatility from a debutanized catalytic cracked gasoline which comprises splitting the cracked gasoline at a cut point of about 200° F. to obtain a light component having an octane number higher than the original catalytic cracked gasoline and a heavy component having an octane number lower than said cracked gasoline, recovering said light component as a first high octane gasoline blending stock, subjecting the heavy component to solvent extraction with an alkylene glycol solvent to separate a high octane aromatics rich extract from a low octane predominantly aliphatic raffinate, the light component and the aromatics rich extract not exceeding about 77 volume percent of the total debutanized catalytic cracked gasoline, recovering said aromatics rich extract as a second high octane gasoline blending stock, subjecting the low octane predominantly aliphatic raffinate to catalytic hydroforming in the presence of a platinum catalyst, and recovering the hydroformed raffinate as a third high octane gasoline blending stock.

24. Process of claim 23 wherein said low octane predominantly aliphatic raffinate is hydroformed while in admixture with a virgin naphtha.

References Cited in the file of this patent

UNITED STATES PATENTS

| | | |
|---|---|---|
| 2,324,295 | Goldsby et al. | July 13, 1943 |
| 2,510,673 | Annable | June 6, 1950 |
| 2,740,751 | Haensel et al. | Apr. 3, 1956 |
| 2,853,437 | Haensel | Sept. 23, 1958 |
| 2,877,173 | Thorne et al. | Mar. 10, 1959 |
| 2,880,164 | Viland | Mar. 31, 1959 |

UNITED STATES PATENT OFFICE
CERTIFICATE OF CORRECTION

Patent No. 2,970,101

January 31, 1961

Carl C. Georgian

It is hereby certified that error appears in the above numbered patent requiring correction and that the said Letters Patent should read as corrected below.

Columns 11 and 12, TABLE V, seventeenth column thereof, item 3, for "8.30" read -- 83.0 --; column 16, lines 55, 56, and 57, strike out "having an octane number higher than the substantially debutanized catalytic cracked gasoline", and insert the same after "component" in line 54, same column 16.

Signed and sealed this 24th day of October 1961.

(SEAL)
Attest:

ERNEST W. SWIDER
Attesting Officer

DAVID L. LADD
Commissioner of Patents

USCOMM-DC